(12) United States Patent
Burghardt et al.

(10) Patent No.: US 7,816,462 B2
(45) Date of Patent: Oct. 19, 2010

(54) METHOD FOR LAMINATING USING SPECIAL CROSS-LINKED CARBODIIMIDE GROUPS

(75) Inventors: Andre Burghardt, Bobenheim-Roxheim (DE); Karl Haeberle, Speyer (DE); Ulrike Licht, Mannheim (DE); Ralf Noerenberg, Ludwigshafen (DE); Karl-Heinz Schumacher, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 11/722,743

(22) PCT Filed: Dec. 21, 2005

(86) PCT No.: PCT/EP2005/013793

§ 371 (c)(1),
(2), (4) Date: Jun. 25, 2007

(87) PCT Pub. No.: WO2006/069703

PCT Pub. Date: Jul. 6, 2006

(65) Prior Publication Data

US 2008/0103266 A1   May 1, 2008

(30) Foreign Application Priority Data

Dec. 23, 2004   (DE) ................. 10 2004 063 380

(51) Int. Cl.
C09J 175/12 (2006.01)
C08G 18/09 (2006.01)
C08G 18/76 (2006.01)
C08G 18/79 (2006.01)

(52) U.S. Cl. ................ 525/452; 525/460; 156/331.7

(58) Field of Classification Search ............... 525/455, 525/458, 460
See application file for complete search history.

(56) References Cited

U.S. PATENT DOCUMENTS

| | | | |
|---|---|---|---|
| 5,498,747 A | | 3/1996 | Pohl et al. |
| 5,504,241 A | | 4/1996 | Pohl et al. |
| 5,574,083 A | * | 11/1996 | Brown et al. ............. 524/186 |
| 5,597,942 A | | 1/1997 | Pohl et al. |
| 5,859,166 A | * | 1/1999 | Sasaki et al. ............. 528/71 |
| 5,958,516 A | | 9/1999 | Imashiro et al. |
| 6,124,398 A | * | 9/2000 | Imashiro et al. ............ 525/61 |
| 6,184,410 B1 | | 2/2001 | Bollmann et al. |
| 6,730,807 B1 | * | 5/2004 | Haberle et al. ............ 562/439 |
| 6,767,954 B2 | * | 7/2004 | Meyer-Roscher et al. ... 524/507 |
| 7,049,001 B2 | * | 5/2006 | Haberle et al. ........... 428/423.1 |
| 2003/0088030 A1 | * | 5/2003 | Haberle et al. ........... 525/326.6 |
| 2003/0220462 A1 | * | 11/2003 | Porzio et al. ............. 528/44 |
| 2009/0004441 A1 | | 1/2009 | Haberle et al. |
| 2009/0029140 A1 | | 1/2009 | Haberle et al. |

FOREIGN PATENT DOCUMENTS

| | | |
|---|---|---|
| DE | 43 18 979 | 12/1994 |
| DE | 198 21 666 | 11/1999 |
| DE | 103 30 748 | 1/2005 |
| EP | 0 686 626 | 12/1995 |

OTHER PUBLICATIONS

Mark, Herman et al., eds. Encyclopedia of Polymer Science and Engineering, 2nd ed., Polyurethanes; vol. 13, p. 269. J. Wiley & Sons: New York, NY 1985.*
Moore, John W. et al. Chemistry: The Molecular Science. Appendix A.3. Brooks/Cole Thomson earning: Toronto, Canada 2002.*
U.S. Appl. No. 08/241,912, filed May 12, 1994, Pohl, et al.

* cited by examiner

*Primary Examiner*—Randy Gulakowski
*Assistant Examiner*—Mike Dollinger
(74) *Attorney, Agent, or Firm*—Oblon, Spivak, McClelland, Maier & Neustadt, L.L.P.

(57) ABSTRACT

A process for adhesively bonding a substrate, using an adhesive comprising a polymer binder and a crosslinker compound I comprising carbodiimide groups, wherein the compound comprising carbodiimide groups is obtainable by reacting
a) carbodiimides of 1,3-bis(1-methyl-1-isocyanatoethyl)benzene, 1,4-bis(1-methyl-1-isocyanatoethyl)benzene or a mixture thereof with
b) polyalkylene oxides having at least two isocyanate-reactive groups, preferably at least two hydroxyl groups, and
c) if appropriate, further compounds reactive with a) or b).

20 Claims, No Drawings

METHOD FOR LAMINATING USING SPECIAL CROSS-LINKED CARBODIIMIDE GROUPS

The invention relates to a process for adhesively bonding substrates, using an adhesive comprising a polymer binder and a crosslinker compound I comprising carbodiimide groups, wherein the compound comprising carbodiimide groups is obtainable by reacting a) carbodiimides of 1,3-bis(1-methyl-1-isocyanatoethyl) benzene, 1,4-bis(1-methyl-1-isocyanatoethyl)benzene or a mixture thereof with b) polyalkylene oxides having at least two isocyanate-reactive groups, preferably at least two hydroxyl groups, and c) if appropriate, further compounds reactive with a) or b).

The invention further relates to specific crosslinkers containing carbodiimide groups that are particularly suitable for these processes.

In the automobile and furniture industries it is common to laminate components with a polymeric sheet. In this case the substrate and/or the sheet for lamination is or are coated by the producer of the laminated component with an adhesive and, following thermal activation of the adhesive where appropriate, the two parts for joining are bonded to one another, generally with application of pressure.

As adhesive it is common to use aqueous polymer dispersions. It is also common practice to add a crosslinker to the dispersion in order to ensure adequate thermal stability of the adhesively bonded assembly. Crosslinkers frequently used are isocyanates; however, owing to their short lifetime of generally not more than one working day, isocyanates cannot be added to the adhesive dispersion until shortly before application, Even in the dry adhesive coating a reaction of the crosslinker occurs after a short time, meaning that it is impossible to produce storable, adhesive-coated laminating sheets.

Adhesive-coated, storable laminating sheets are described in DE-A 103 30 748 (file reference 10330748.6), unpublished at the priority date of the present specification; the adhesive used comprises compounds containing carbodiimide groups as crosslinkers.

Compounds comprising carbodiimide groups, including those based on bis(1-methyl-1-isocyanatoethyl)benzene (TMXDI for short), are known for different uses from EP-A 686 626, DE-A 198 21 666 and DE-A 43 18 79.

The performance properties of the adhesives used in laminating is to be improved further. Besides effective adhesion to the substrates to be bonded, there is a need for high strength in the resultant assembly, particularly at high temperatures (thermal stability).

One object of the present invention, therefore, was an adhesive bonding process, in particular a laminating process, which meets the above requirements and allows products having very good performance properties.

A further object was to find adhesives and crosslinkers suitable for such a process.

In accordance with these objectives the process defined at the outset was found. Also found were adhesives and crosslinkers suitable for this process.

The adhesive used in the process of the invention comprises a cross inker compound comprising carbodiimide groups (compound I for short).

Compound I is synthesized from the carbodiimides a), polyalkylene oxides b), and, if appropriate, further reaction compounds c).

As to a):

1,3-bis(1-Methyl-1-isocyanatoethyl)benzene (also m-tetramethylxylyl diisocyanate=m–TMXDI) is a diisocyanate of the following formula:

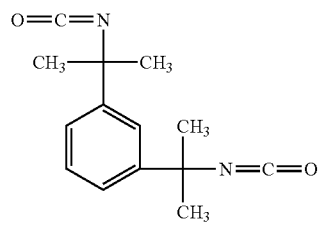

1,4-bis(1-Methyl-1-isocyanatoethyl)benzene (also -tetramethylxylyl diisocyanate=p–TMXDI) is a diisocyanate of the following formula:

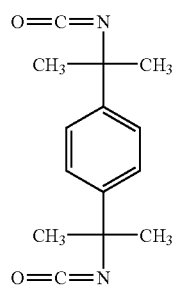

a) may comprise carbodiimides based on m-TMXDI, p-TMXDI or mixtures thereof; preference is given to carbodiimides based on m-TMXDI.

Carbodiimide groups are easily obtainable from two isocyanate groups with the elimination of carbon dioxide:

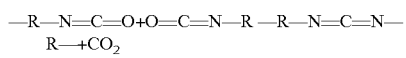

Starting from TMXDI it is possible in this way to obtain carbodiimides a) having two or more carbodiimide groups and possibly isocyanate groups, especially terminal isocyanate groups.

Preference is given to carbodiimides a) containing on average 1 to 20, preferably 1 to 15 and with particular preference 2 to 10 carbodiimide groups.

The number-average molar weight $M_n$ of the carbodiimides a) is preferably 100 to 10 000, more preferably 200 to 5000 and very particularly 500 to 2000 g/mol.

The number-average molar weight is determined by end-group analysis of the diisocyanates (i.e., consumption of the isocyanate groups by carbodiimidization; see below) or, if endgroup analysis is not possible, by gel permeation chromatography (polystyrene standard, THF as eluent).

As to b):

Polyalkylene oxides b) have at least 2, preferably 2 to 4 and more preferably 2 isocyanate-reactive groups.

In particular the reactive groups are hydroxyl groups.

Preferably, therefore, b) is a diol.

The alkylene oxide groups can in particular be ethylene oxide groups ($-CH_2-CH_2-O-$) or propylene oxide groups

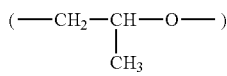

or mixtures thereof, Preference is given to ethylene oxide groups.

b), accordingly, is preferably composed exclusively with alkylene oxide groups and the reactive groups, especially hydroxyl groups; the latter are arranged, in particular, in terminal positions.

Particularly preferred compounds b) are those of the formula

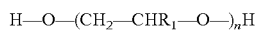

where $R^1$ is a $C_3$ group or, preferably, is a hydrogen atom and n is an integer from 1 to 100, preferably 1 to 50.

As to c):

Compounds I may also, in addition, comprise further compounds c) as synthesis components.

Suitable examples include other isocyanates or compounds which carry isocyanate-reactive groups, such as hydroxyl or amino groups.

Further compounds c), however, are not necessary for the purposes of the present invention, and are therefore used preferably only n minor amounts of less than 5% by weight, based on the sum of a)+b)+c), or more preferably not at all.

Compounds I are obtainable in a simple manner by reacting the isocyanate groups (i) with the isocyanate-reactive ratio (i):(ii) is preferably 1:10 to 10:1.

Compounds I are preferably liquid at room temperature (25° C., 1 bar).

Compounds I are composed preferably of at least 40% to 80% by weight of alkylene oxide groups, more preferably of 40% to 70% by weight of alkylene oxide groups, especially ethylene oxide groups.

Compounds I have on average preferably 2 to 3, more preferably 2, hydroxyl groups per molecule the amount of isocyanate groups and other isocyanate-reactive groups is preferably on average less than 0.1 per molecule.

With particular preference compounds comprise no isocyanate groups or other isocyanate-reactive groups.

Additionally, ionic groups or groups which can be converted into ionic groups are preferably not comprised in compound I.

The adhesive used in the process of the invention comprises at least one polymeric binder and, if appropriate, additives such as fillers, thickeners, defoamers, dyes, pigments, etc.

The polymeric binder is preferably a polyurethane, a free-radically polymerized polymer or mixtures thereof. The polymeric binders are preferably in the form of aqueous dispersions.

The polyurethanes are composed predominantly, preferably, of polyisocyanates, in particular diisocyanates and polyesterdiols, polyetherdiols or mixtures thereof.

Preferably at least 40% by weight, more preferably at least 60% by weight, and very preferably at least 80% by weight of the polyurethane is synthesized from diisocyanates, polyetherdiols and/or polyesterdiols.

The polyurethane preferably has a softening point or melting point in the range from −50 to 150° C. more preferably from 0 to 100° C. and very preferably from 10 to 90° C.

With particular preference the polyurethane has a melting point within the above temperature range.

For this purpose the polyurethane preferably comprises polyesterdiols in an amount of more than 10% by weight, based on the polyurethane.

Overall the polyurethane is preferably synthesized from:
a) diisocyanates,
b) diols of which
   $b_1$) from 10 to 100 mol %, based on the total amount of the diols (b), have a molecular weight of from 500 to 5000 g/mol, and
   $b_2$) from 0 to 90 mol %, based on the total amount of the diols (b), have a molecular weight of from 60 to 500 g/mol,
c) monomers other than the monomers (a) and (b), having at least one isocyanate group or at least one group which is reactive toward isocyanate groups, said monomers further carrying at least one hydrophilic group or one potentially hydrophilic group which renders the polyurethanes dispersible in water,
d) if desired further, polyfunctional compounds which are different than the monomers (a) to (c) and contain reactive groups which are alcoholic hydroxyl groups, primary or secondary amino groups or isocyanate groups, and
e) if desired, monofunctional compounds which are different than the monomers (a) to (d) and which have a reactive group which is an alcoholic hydroxyl group, a primary or secondary amino group or an isocyanate group.

As monomers (a) mention may be made in particular of diisocyanates $X(NCO)_2$, in which X is an aliphatic hydrocarbon radical having 4 to 15 carbon atoms, a cycloaliphatic or aromatic hydrocarbon radical having 6 to 15 carbon atoms or an araliphatic hydrocarbon radical having 7 to 15 carbon atoms. Examples of such diisocyanates include tetramethylene diisocyanate, hexamethylene diisocyanate, dodecamethylene diisocyanate, 1 4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanato-diphenylmethane, 2,4'-diisocyanato-diphenylmethane, p-xylylene diisocyanate, tetramethylxylylene diisocyanate (TMXDI), the isomers of bis(4-isocyanatocyclohexyl)methane (HMDI) such as the trans/trans, the cis/cis, and the cis/trans isomer, and mixtures of these compounds.

Diisocyanates of this kind are available commercially.

Particularly important mixtures of these isocyanates are the mixtures of the respective structural isomers of diisocyanatotoluene and diisocyanatodiphenylmethane; the mixture of 80 mol % 2,4-diisocyanatotoluene and 20 mol % 2,6-diisocyanatotoluene is especially suitable. Also of particular advantage are the mixtures of aromatic isocyanates such as 2,4diisocyanatotoluene and/or 2,6-diisocyanatotoluene with aliphatic or cycloaliphatic isocyanates such as hexamethylene diisocyanate or IPDI, the preferred ratio of the aliphatic to the aromatic isocyanates being from 4:1 to 1:4.

Compounds which can be used to synthesize the polyurethanes include, in addition to the aforementioned compounds, isocyanates which as well as the free isocyanate groups carry further, blocked isocyanate groups, e.g., uretdione groups.

With a view to effective filming and elasticity, suitable diols (b) include principally diols (b1) of relatively high molecular weight, which have a molecular weight of from about 500 to 5000, preferably from about 1000 to 3000 g/mol. The molecular weight in question here is the number-average molar weight Mn. Mn is found by determining the number of endgroups (OH number).

The diols (b1) can be polyester polyols, which are known, for example, from Ullmanns Encykiopädie der technischen Chemie, 4$^{th}$ edition, volume 19, pp. 62 to 65. it is preferred to use polyester polyols obtained by reacting dihydric alcohols with dibasic carboxylic acids. Instead of the free polycarboxylic acids it is also possible to use the corresponding polycarboxylic anhydrides or corresponding carboxylic esters of lower alcohols or mixtures thereof to prepare the polyester polyols. The polycarboxylic acids can be aliphatic, cycloaliphatic, araliphatic, aromatic or heterocyclic and where appropriate may be substituted, by halogen atoms for example, and/or unsaturated. Examples that may be mentioned include the following: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, and dimeric fatty acids. Preference is given to dicarboxylic acids of the general formula HOOC—(CH$_2$)—COOH, in which y is a number from 1 to 20, preferably an even number from 2 to 20, examples being succinic acid, adipic acid, sebacic acid, and dodecanedicarboxylic acid.

Examples of suitable polyhydric alcohols include ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)-cyclohexane, 2-methylpropane-1,3-diol, methylpentane diols, and also diethylene glycol, triethylene glycol, tetraethylene glycol, polyethylene glycol, dipropylene glycol, polypropylene glycol, and dibutylene glycol and polybutylene glycols. Preferred alcohols are of the general formula HO—(CH$_2$)$_x$—OH, in which x is a number from 1 to 20, preferably an even number from 2 to 20. Examples thereof are ethylene glycol, butane-1,4-diol, hexane-1,4-diol, octane-1,8-diol, and dodecane-1,12-diol. Preference further attaches to neopentyl glycol.

Also suitable, furthermore, where appropriate are polycarbonatediols, such as may be obtained, for example, by reacting phosgene with an excess of the low molecular mass alcohols mentioned as synthesis components for the polyester polyols.

Where appropriate it is also possible to use lactone-based polyesterdiols, which are homopolymers or copolymers of lactones, preferably hydroxyl-terminated adducts of lactones with suitable difunctional starter molecules. Suitable lactones include preferably those derived from compounds of the general formula HO—(CH$_2$)$_z$—COOH in which z is a number from 1 to 20 and one hydrogen atom of a methylene unit may also be substituted by a C$_1$ to C$_4$ alkyl radical. Examples are ε-caprolactone, β-propiolactone, γ-butyrolactone and/or methyl-γ-caprolactone and also mixtures thereof. Examples of suitable starter components are the low molecular weight, dihydric alcohols specified above as a synthesis component for the polyester polyols. The corresponding polymers of ε-caprolactone are particularly preferred. Lower polyesterdiols or polyetherdiols can also be used as starters for preparing the lactone polymers. Instead of the polymers of lactones it is also possible to use the corresponding, chemically equivalent polycondensates of the hydroxycarboxylic acids corresponding to the lactones.

Polyetherdiols are obtainable in particular by polymerizing ethylene oxide, propylene oxide, butylene oxide, tetrahydrofuran, styrene oxide or epichlorohydrin with itself, in the presence for example of BF$_3$, or by subjecting these compounds, alone or in a mixture or in succession, to addition reaction with starter components containing reactive hydrogen atoms, such as alcohols or amines, e.g., water, ethylene glycol, propane-1,2-diol, propane-1,3-diol, 2,2-bis(4-hydroxyphenyl)propane or aniline. Particular preference is given to polypropylene oxide and to polytetrahydrofuran with a molecular weight of from 240 to 5000 and in particular from 500 to 4500.

b$_{1)}$ embraces only polyetherdiols consisting of less than 20% by weight of ethylene oxide. Polyetherdiols containing at least 20% by weight are hydrophilic polyetherdiols which are included in monomers c).

Where appropriate it is also possible to use polyhydroxyolefins, preferably those having two terminal hydroxyl groups, e.g., α,ω-dihydroxypolybutadiene, α,ω-dihydroxypoly-methacrylic esters or α,ω-dihydroxypolyacrylic esters as monomers (c1). Such compounds are known from, for example, SEPA 0622378. Further suitable polyols are polyacetals, polysiloxanes, and alkyd resins.

With preference at least 95 mol % of the diols b$_{1)}$ are polyesterdiols. With particular preference polyesterdiols are used exclusively as diols b$_{1)}$.

The hardness and elasticity modulus of the polyurethanes can be increased by using as diols (b) not only the diols (b1) but also low molecular weight diols (b2) having a molecular weight of from about 60 to 500, preferably from 62 to 200 g/mol.

As monomers (b2) use is made in particular of the synthesis components of the short-chain alkanediols specified for the preparation of polyester polyols, preference being given to the unbranched diols having 2 to 12 carbon atoms and an even number of carbon atoms and also to pentane-1,5-diol and neopentyl glycol.

Examples of suitable diols b$_{2)}$ include ethylene glycol, propane-1,2-diol, propane-1,3-diol, butane-1,3-diol, butene-1,4-diol, butyne-1,4-diol, pentane-1,5-diol, neopentyl glycol bis(hydroxymethyl)cyclohexanes such as 1,4-bis(hydroxymethyl)cyclohexane, 2-methylpropane-1,3-diol, methylpentane diols, and also diethylene glycol, triethylene glycol, tetraethylene glycol, polyethylene glycol, dipropylene glycol, polypropylene glycol dibutylene glycol and polybutylene glycols. Preference is given to alcohols of the general formula HO—(CH$_2$)$_x$—OH, in which x is a number from 1 to 20, preferably an even number from 2 to 20. Examples thereof are ethylene glycol, butane-1,4-diol, hexane-1,6-diol, octane-1,8-diol, and dodecane-1,12-diol. Preference further attaches to neopentyl glycol.

Based on the total amount of the diols (b) the fraction of the diols (b$_1$) is preferably from 10 to 100 mol % and the fraction of the monomers (b$_2$) is preferably from 0 to 90 mol %. With particular preference the ratio of the diols (b1) to the monomers (b2) is from 0.1:1 to 5:1, more preferably from 0.2:1 to 2:1.

In order for the polyurethanes to attain dispersibility in water they include monomers (c) which are different than components (a) (b), and (d) and which carry at least one isocyanate group or at least one group which is reactive toward isocyanate groups and additionally at least one hydrophilic group or one group which can be converted into a hydrophilic group, as a synthesis component. In the text below the term "hydrophilic groups or potentially hydrophilic groups" is abbreviated to "(potentially) hydrophilic groups". The (potentially) hydrophilic groups react with isocyanates substantially more slowly than do the functional groups of the monomers which serve to synthesize the polymer main chain.

The proportion of the components containing (potentially) hydrophilic groups as a fraction of the total amount of components (a), (b), (c), (d), and (e) is generally calculated such that the molar amount of the (potentially) hydrophilic groups, based on the amount by weight of all monomers (a) to (e), is from 30 to 1000, preferably from 50 to 500, and more preferably from 80 to 300 mmol/kg.

The (potentially) hydrophilic groups can be nonionic or, preferably, (potentially) ionic hydrophilic groups.

As nonionic hydrophilic groups particular suitability is possessed by polyethylene glycol ethers composed of preferably from 5 to 100, more preferably from 10 to 80 repeating ethylene oxide units. The amount of polyethylene oxide units is generally from 0 to 10%, preferably from 0 to 6% by weight, based on the amount by weight of all monomers (a) to (e).

Preferred monomers containing nonionic hydrophilic groups are polyethylene oxide diols with at least 20% by weight of ethylene oxide, polyethylene oxide monools, and the reaction products of a polyethylene glycol and a diisocyanate which carry a terminally etherified polyethylene glycol radical. Diisocyanatas of this kind and processes for preparing them are specified in patents U.S. Pat. Nos. 3,905,929 and 3,920,598.

Ionic hydrophilic groups are, in particular, anionic groups such as the sulfonate, the carboxylate and the phosphate group in the form of their alkali metal or ammonium salts and also cationic groups such as ammonium groups, especially protonated tertiary amino groups or quaternary ammonium groups.

Potentially ionic hydrophilic groups are, in particular, those which can be converted by simple neutralization, hydrolysis or quaternization reactions into the abovementioned ionic hydrophilic groups—that is, for example, carboxylic acid groups or tertiary amino groups.

(Potentially) ionic monomers (c) are described in, for example, Ullmanns Encyklopädie der technischen Chemie, 4$^{th}$ edition volume 19, pp. 311-313 and at length in DE-A 1 495 745, for example (Potentially) cationic monomers (c) of particular practical importance are, in particulars monomers containing tertiary amino groups examples being the following: tris-(hydroxyalkyl)amines, N,N'-bis(hydroxyalkyl)alkylamines, N-hydroxyalkyl-dialkylamines, tris(aminoalkyl)amines, N,N'-bis(aminoalkyl)alkylamines, N-aminoalkyl-dialkylamines, the alkyl radicals and alkanediyl units of these tertiary amines being composed independently of one another of 1 to 6 carbon atoms. Also suitable are polyethers containing tertiary nitrogen atoms and preferably two terminal hydroxyl groups such as are obtainable in conventional manner by means for example, of alkoxylating amines having two hydrogen atoms attached to amine nitrogen e.g. methylamine, aniline or N, N'-dimethylhydrazine. Polyethers of this kind generally have a molar weight of between 500 and 6000 g/mol.

These tertiary amines are converted into the ammonium salts either with acids, preferably strong mineral acids such as phosphoric acid, sulfuric acid or hydrohalic acids or with strong organic acids or by reaction with suitable quaternizing agents such as $C_1$ to $C_6$ alkyl halides or benzyl halides e.g. bromides or chlorides.

Suitable monomers containing (potentially) anionic groups are, customarily aliphatic, cycloaliphatic, araliphatic or aromatic carboxylic acids and sulfonic acids which carry at least one alcoholic hydroxyl group or at least one primary or secondary amino group. Preference is given to dihydroxyalkylcarboxylic acids especially of 3 to 10 carbon atoms, as are also disclosed in U.S. Pat. No. 3,412,054. Particular preference is given to compounds of the formula ($c_1$)

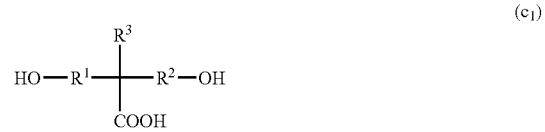

in which $R^1$ and $R^2$ are each a $C_1$ to $C_4$ alkanediyl (unit) and $R^3$ is a $C_1$ to $C_4$ alkyl (unit), and especially to dimethylolpropionic acid (DMPA).

Suitability is further possessed by corresponding dihydroxysulfonic acids and dihydroxyphosphonic acids such as 2,3-dihydroxypropanephosphonic acid.

Otherwise suitable are dihydroxyl compounds having a molecular weight of more than 500 to 10 000 g/mol and at least 2 carboxylate groups, which are known from DE-A 3 911 827. They can be obtained by reacting dihydroxyl compounds with tetracarboxylic dianhydrides such as pyromellitic dianhydride or cyclopentanetetracarboxylic dianhydride in a molar ratio of from 2:1 to 1.05:1 in a polyaddition reaction. Particularly suitable dihydroxyl compounds are the monomers (b2) mentioned as chain extenders and also the diols (b1).

Suitable monomers (c) containing isocyanate-reactive amino groups include aminocarboxylic acids such as lysine, β-alanine or the adducts of aliphatic diprimary diamines with α,β-unsaturated carboxylic or sulfonic acids that are specified in DE-A 2034479.

Such compounds conform, for example, to the formula ($c_2$)

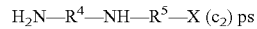 ps in which
$R^4$ and $R^5$ independently of one another are a $C_1$ to $C_6$ alkanediyl unit, preferably ethylene,
and X is COOH or $SO_3H$.

Particularly preferred compounds of the formula ($C_2$) are N-(2-aminoethyl)-2-aminoethanecarboxylic acid and also N-(2-aminoethyl)-2-aminoethanesulfonic acid and the corresponding alkali metal salts, with Na being a particularly preferred counterion.

Particular preference is also given to the adducts of the abovementioned aliphatic diprimary diamines with 2-acrylamido-2-methylpropanesulfonic acid, such as are described in, for example, DE-B 1 954 090.

Where monomers containing potentially ionic groups are used, they can be converted into the ionic form before, during or, preferably, after the isocyanate polyaddition, since the ionic monomers are frequently difficult to dissolve in the reaction mixture. With particular preference the sulfonate or carboxylate groups are in the form of their salts with an alkali metal ion or with an ammonium ion as counterion.

The monomers (d), which are different than the monomers (a) to (c) and which are also, where appropriate, constituents of the polyurethane, serve generally for crosslinking or chain extension. In general they are nonphenolic alcohols with a functionality of more than two, amines with two or more primary and/or secondary amino groups, and compounds which carry not only one or more alcoholic hydroxyl groups but also one or more primary and/or secondary amino groups.

Alcohols with a functionality of more than two that can be used to set a certain degree of branching or crosslinking are, for example, trimethylolpropane, glycerol or sucrose.

Others which come into consideration are monoalcohols which as well as the hydroxyl group carry a further isocyanate-reactive group, such as monoalcohols containing one or more primary and/or secondary amino groups, an example being monoethanolamine.

Polyamines having two or more primary and/or secondary amino groups are used in particular when chain extension or crosslinking is to take place in the presence of water, since amines generally react faster with isocyanates than do alcohols or water. This is frequently necessary when the desire is for aqueous dispersions of crosslinked polyurethanes or of polyurethanes having a high molar weight. In such cases a procedure is followed in which isocyanato-containing prepolymers are prepared, are dispersed rapidly in water, and then are chain-extended or crosslinked by adding compounds having two or more isocyanate-reactive amino groups.

Amines suitable for this purpose are generally polyfunctional amines from the molar weight range from 32 to 500 g/mol, preferably from 60 to 300 g/mol, which contain at least two amino groups selected from the group consisting of primary and secondary amino groups. Examples thereof are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4, 4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane.

The amines may also be employed in blocked form, e.g., in the form of the corresponding ketimines (see CA-A 1 129 128, for example), ketazines (see U.S. Pat. No. 4,269,748, for example) or amine salts (see U.S. Pat. No. 4,292,226). Oxazolidines as well, as used for example in U.S. Pat. No. 4,192,937, constitute blocked polyamines which, for the preparation of the polyurethanes of the invention, can be used for chain extending the prepolymers. Where such blocked polyamines are used, they are generally mixed with the prepolymers in the absence of water to form a mixture which is subsequently combined with the dispersion water or with part of the dispersion water, such that the corresponding polyamines are released by hydrolysis.

It is preferred to use mixtures of diamines and triamines, more preferably mixtures of isophoronediamine (PDA) and diethylenetriamine (DETA).

The polyurethanes comprise preferably from 1 to 30 mol %, more preferably from 4 to 25 mol %, based on the total amount of components (b) and (d), of a polyamine having at least two isocyanate-reactive amino groups, as monomers (d).

For the same purpose it is also possible as monomers (d) to use isocyanates having a functionality of more than two. Examples of commercially customary compounds include the isocyanurate or the biuret of hexamethylene diisocyanate, Monomers (e), which are used additionally if desired, are monoisocyanates, monoalcohols, and mono-primary and -secondary amines. Their proportion is in general not more than 10 mol %, based on the total molar amount of the monomers. These monofunctional compounds normally carry further functional groups such as olefinic groups or carbonyl groups, and serve to introduce functional groups into the polyurethane that allow the dispersing or the crosslinking or further polymer-analogous reaction of the polyurethane. Monomers suitable for this purpose are those such as isopropenyl-α,α-dimethylbenzyl isocyanate (TMI) and esters of acrylic or methacrylic acid such as hydroxyethyl acrylate or hydroxyethyl methacrylate.

Coatings having a particularly good profile of properties are obtained in particular when substantially only aliphatic diisocyanates, cycloaliphatic diisocyanates or araliphatic diisocyanates are used as monomers (a).

This monomer combination is outstandingly supplemented, as component (c), by alkali metal salts of diaminosulfonic acids, especially by N-(2-aminoethyl)-2-aminoethanesulfonic acid and/or its corresponding alkali metal salts, the Na salt being the most suitable, and by a mixture of DETA/IPDA as component (d).

Within the field of polyurethane chemistry it is general knowledge as to how the molecular weight of the polyurethanes can be adjusted through the choice of the proportions of the interreactive monomers and of the arithmetic mean of the number of reactive functional groups per molecule.

Normally the components (a) to (e) and also their respective molar amounts are selected such that the ratio A:B, where A is the molar amount of isocyanate groups and B is the sum of the molar amount of hydroxyl groups and the molar amount of the functional groups which are able to react with isocyanates in an addition reaction, is from 0.5:1 to 2:1, preferably fro 0.8:1 to 1.5, more preferably from 0.9:1 to 1 .21

With very particular preference the ratio A:B is as close as possible to 1:1.

The monomers (a) to (e) employed carry on average usually from 1.5 to 2.5, preferably from 1.9 to 2.1, more preferably 2.0 isocyanate groups and/or functional groups which are able to react with isocyanates in an addition reaction.

The polyaddition of components (a) to (e) for the preparation of the polyurethane takes place preferably at reaction temperatures of up to 180° C., r ore preferably up to 150° C., under atmospheric pressure or under the autogenous pressure.

The preparation of polyurethanes and of aqueous polyurethane dispersions is known to the skilled worker.

Where carbodiimides are to be attached to the polyurethane, it is possible during the preparation of polyurethanes to use carbodiimides containing terminal isocyanate groups (see above) as diisocyanates a) in the desired amount.

The polymeric binder can also be a free-radically polymerized polymer; in other words, the polymer is obtainable by free-radical addition polymerization of ethylenically unsaturated compounds (monomers).

The polymer is composed preferably of at least 4% by weight, more preferably at leas 60% by weight and, with particular preference, at least 80% by weight of what are called principal monomers.

The principal monomers are selected from $C_1$-$C_{20}$ alkyl (meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or o double bonds, and mixtures of these monomers.

Examples include (meth)acrylic acid alkyl esters having a $C_1$-$C_{10}$ alkyl radical, such as methyl methacrylate, methyl acrylate, n-butyl acrylate, ethyl acrylate and 2-ethylhexyl acrylate.

In particular, mixtures of the (meth)acrylic acid alkyl esters as well are suitable.

Vinyl esters of carboxylic acids having 1 to 20 carbon atoms are, for example, vinyl laurate, vinyl stearate, vinyl propionate, Versatic acid vinyl esters, and vinyl acetate.

Suitable vinylaromatic compounds include vinyltoluene, α- and p-methylstyrene, α-butylstyrene, 4-n-butylstyrene, 4-n-decylstyrene, and, preferably, styrene. Examples of nitrites are acrylonitrile and methacrylonitrile.

The vinyl halides are ethylenically unsaturated compounds substituted by chloro, fluoro or bromo, preferably vinyl chloride and vinylidene chloride.

Examples of vinyl ethers include vinyl methyl ether and vinyl isobutyl ether. Preference is given to vinyl ethers of alcohols comprising 1 to 4 carbon atoms.

As hydrocarbons having 2 to 8 carbon atoms and one or two olefinic double bonds mention may be made of ethylene, propylene, butadiene, isoprene, and chloroprene.

Preferred principal monomers are the $C_1$ to $C_{10}$ alkyl acrylates and methacrylates, especially $C_1$ to $C_8$ alkyl acrylates and methacrylates, and vinylaromatics, especially styrene and mixtures thereof.

Likewise preferred as principal monomers are vinyl esters and aliphatic hydrocarbons, and mixtures thereof, for example vinyl acetate, ethylene, and mixtures thereof.

Very particular preference is given to methyl acrylate, methyl methacrylate, ethyl acrylate, n-butyl acrylate, n-hexyl acrylate, octyl acrylate, and 2-ethylhexyl acrylate, styrene, and mixtures of these monomers.

Besides the principal monomers the polymer may comprise further monomers, e.g., monomers containing carboxylic, sulfonic or phosphonic acid groups. Carboxylic acid groups are preferred. Examples that may be mentioned include acrylic acid, methacrylic acid, itaconic acid, maleic acid, and fumaric acid.

Further monomers are, for example, monomers also comprising hydroxyl groups, especially $C_1$-$C_{10}$ hydroxyalkyl (meth)acrylates, and (meth)acrylamide.

Further monomers that may additionally be mentioned include phenyloxyethyl glyco mono(meth)acrylate, glycidyl acrylate, glycidyl methacrylate, and amino (meth)acryiates such as 2-aminoethyl (meth)acrylate.

Further monomers that may also be mentioned are crosslinking monomers.

The polymer is composed preferably of at least 40% by weight, in particular at least 60% by weight, and very preferably at least 80% by weight of $C_1$-$C_{20}$, especially $C_1$-$C_{10}$, alkyl (meth)acrylates.

In one preferred embodiment the polymer is prepared by emulsion polymerization and is therefore an emulsion polymer.

Polymer can also be prepared, however, by solution polymerization followed by dispersion in water.

As to the adhesive:

In summary, the adhesive is preferably an aqueous adhesive. For this purpose the polymeric binder is preferably in the form of an aqueous dispersion. Further additives can be added easily to the aqueous dispersion of the polymeric binder.

In particular it is possible for compounds I simply to be stirred into the aqueous dispersion.

The amount of compounds I is preferably 0.1 to 10 parts by weight, more preferably 0.2 to 8 parts by weight, per 100% by weight of polymeric binder (solids, without water).

The adhesive used according to the process of the invention comprises preferably 0.0001 to 0.1 mol, preferably 0.0005 to 0.1 mol, more preferably 0.001 to 0.1 mol of carbodiimide groups per 100 g of adhesive; water or other organic solvents with a boiling point below 150° C. at 1 bar are not taken into account in the context of the amount by weight of the adhesive, In particular the amount of carbodiimide groups is not higher than 0.05 mol/ J100 g of adhesive.

In particular at least 80 mol %, more preferably at least 90 mol % and very preferably 100 mol % of the carbodiimide groups present in the adhesive are carbodiimide groups of the compound .

Further additives are, for example, thickeners, flow assistants, defoamers, and pigments.

As to the process:

In the process of the invention it is possible for any desired substrates to be bonded to one another.

In particular the process can be employed for producing furniture, vehicles, such as for bonding interior vehicle linings, for example, or for producing footwear.

A plurality of nonflexible substrates can be bonded to one another, and also nonflexible substrates, e.g., plates or other shaped parts, can be bonded to one another.

With particular preference the process of the invention is a laminating process, in which nonflexible substrates are adhesively bonded (laminated) to a flexible flat substrate.

By a flexible substrate is meant a flat substrate which with an area of 50×50 cm, held para el to the surface of the earth at one side, bends as a result of its inherent weight.

The substrate is preferably one which can be wound around drums having an external diameter of 80 cm.

The flexible substrates are preferably flat substrates with a thickness of less than 10 mm, in particular less than 5 mm, more preferably less than 0.5 mm, and very preferably less than 0.3 mm.

The substrates may in particular comprise polymer sheets, metal foils, nonwovens made of synthetic or natural fibers, coated or uncoated paper, or else veneers of real or imitation wood.

Particular preference is given to polymer sheets, e.g., films of polyester, such as polyethylene terephthalate, polyolefins such as polyethylene, polypropylene or polyvinyl chloride, of polyacetate, polystyrene or styrene copolymers.

The flexible substrate ay have been retreated, e.g., coated with adhesive proroters. The flexible substrate may also have been Constructed from two or more layers, consideration may be given, for example, to a support layer made of the above polymers and, applied to one or both sides of said support layer, protective or decorative coatings; also suitable, in particular, is a multilayer substrate which comprises one layer of foamed polymers, The nonflexible substrate may be a molding, whose external form is retained even if it is loaded with its inherent weight, by being held, for example, hanging freely, at just a single arbitrary point.

The details above refer to standard conditions 21° C., 1 bar), The nonflexible substrate may be of wood or plastic e.g., ABS (acrylonitrile-butadiene-styrene). It may, for example, be solid wood or plywood, hardboard panels or medium-density fiberboard (MDF) panels.

The nonflexible substrate may in particular comprise shaped parts constructed of synthetic or natural fibers or chips. The shape of the shaped parts is arbitrary.

In the process of the invention it is possible first of all to coat the nonflexible substrate with the adhesive and, after drying if appropriate, to laminate the flexible substrate onto it.

In the process of the invention, however, it is also possible, in particular to coat the flexible substrate with adhesive. Coating may take place according to customary application methods. Coating is followed by drying, preferably at room temperature or temperatures up to 80° C., in order to remove water or other solvents, after which the coated flexible substrate can be laminated on.

The amount of adhesive applied (to the flexible or nonflexible substrate) is preferably 0.5 to 100 $g/m^2$, more preferably 2 to 80 $g/m^2$, very preferably 10 to 70 $g/m^2$.

The adhesive-coated substrate can be stored.

The coated flexible substrate can be wound up after drying, if appropriate, has taken place. Further processing is generally preceded by storage or transportation, so that a time of more than a week, or more than 3 weeks, or in particular more than 6 weeks, or more than 10 weeks, elapses before the further processing.

The coated substrate is storage-stable, that is, even after a storage time of several weeks, the coated substrate can be processed with the same good results.

For adhesive bonding to the nonflexible substrate, the parts to be bonded are joined The temperature in the adhesive layer is preferably from 20 to 200° C., more preferably from 30 to 180° C. The coated flexible substrate can suitably be heated to corresponding temperatures for this purpose.

Adhesive bonding takes place preferably under pressure, for which purpose the parts to be bonded can be pressed together, for example, with a pressure of from 0.05 to 50 N/mm$^2$.

The assemblies obtained feature high mechanical strength even at elevated temperatures (thermal stability) or under highly fluctuating climatic conditions (climatic resistance). These goods results are achieved even if the coated flexible substrate has been stored for a long time prior to bonding, e.g., more than 3 months.

Additionally the plasticizer stability scratch resistance and blocking resistance are good.

The carbodiimide crosslinker I is storage-stable in pure form, in water and in the aqueous dispersion, and can be readily emulsified in water.

The process of the invention is of particular importance in the automobile or furniture industry, including for example in the adhesive bonding of flexible substrates to automotive interior parts, such as dashboards, inner door linings, and parcel shelves.

EXAMPLES

Synthesis

Example 1

250 g of a TMXDI-based carbodiimide having an NCO content of 6.7% by weight were charged to a stirred flask, 250 g of a polyethylene oxide-diol having a number-average molar weight of 500 g were added and the mixture was heated to 120° C. After stirring for three hours the NCO content of the batch had dropped to <0.1% by weight.

A yellowish oil was obtained which was readily emulsifiable in water by shaking.

The viscosity at 50° C. was 2280 mPas.

Comparative Example 1

250 g of a TMVXDI-based carbodiimide having an NCO content of 6.7% by weight were charged to a stirred flask. 250 g of a polyethylene oxide monomethyl ether having a number-average molar weight of 500 g were added and the mixture was heated to 120° C. After stirring for three hours the NCO content of the batch had dropped to <0.1% by weight.

A yellowish oil was obtained which was readily emulsifiable in water by shaking The viscosity at 50° C. was 795 mPas.

Synthesis of a polyurethane dispersion:

A polyurethane dispersion was prepared according to Example 3 of DE-A 2 804 609 but replacing the toluene diisocyanate by the equimolar amount of isophorone diisocyanate.

Testing:

The adhesive batches listed in the table were prepared: Quantities given in grams

|  | Adhesive | | | | |
| --- | --- | --- | --- | --- | --- |
|  | 1 | 2 | 3 | 4 | 5 |
| Polyurethane dispersion | 100 | 100 | 100 | 100 | 100 |
| Collacral ® LR8989 10% in water | 6 | 6 | 6 | 6 | 6 |
| Carbodiimide (Example 1) | 2 | 5 |  |  |  |
| Carbodiimide Comparative Example 1) |  |  | 2 | 5 |  |

Collacral ® LR8989 is a polyurethane associative thickener from BASF AG.

After different storage conditions, the adhesive batches were subjected to a thermal stability test.

For this purpose the adhesive batches were drawn down onto a hardboard panel measuring 200×200 mm, using a 2 mm wire doctor, and were dried at 60° C. for 5 minutes. The adhesive layer was then heated to 80° C. by means of a heatable press and a PVC sheet from Benecke, measuring 200×200 mm, was laminated on under a pressure of 0.1 N/mm$^2$ for 30 seconds so that the adhesion area was 200×170 mm in size.

Following adhesive application, drying and pressing, the specimens were conditioned at room temperature for 24 hours and then the PVC sheet was cut into strips 30 mm wide with a space of 10 mm in between. In this operation, only the sheet was penetrated; the hardboard panel remained undamaged. The 10 mm intermediate strips were removed, the ends of the remaining test strips were folded over at an angle of 1800 on one side, and the panel was mounted vertically in a force-air drying cabinet so that the turned-over ends of the test strips were at the top. The drying cabinet was heated at 40° C.

A 300 g weight was clamped to the peeled ends of the test strips, and the edge of the bond was marked as a starting point for testing.

The test begins at 40° C. At 30-minute intervals the temperature is raised by 10° C. In the heating phase there is no load on the test strips.

The parameter assessed is the temperature, measured in °C., at which the adhesive bond comes undone. The test ends when the test strips have detached by more than 130 millimeters.

Test 1: Thermal stability (TS) after storage of the adhesively bonded assembly at PT for 24 h Run-down distance in mm at the respective test temperature, averages of five measurements

| Temperature (° C.) | Example 1 | Example 2 | Example 3 (Comparative) | Example 4 (Comparative) | Example 5 (Comparative) |
| --- | --- | --- | --- | --- | --- |
| 40 | — | — | — | — | — |
| 50 | 1 | 2 | 1 | 2 | 18 |
| 60 | 1 | 1 | 1 | 2 | 118 |
| 70 | 1 | 1 | 1 | 1 | all > 130 |
| 80 | 1 | 1 | 1 | 1 |  |
| 90 | 1 | 1 | 1 | 1 |  |
| 100 | 1 | 1 | 2 | 2 |  |
| 110 | 21 | 3 | 39 | 34 |  |
| 120 | 96 | 15 | all > 130 | all > 130 |  |

Test 2: TS after four weeks' storage of the adhesive formulation at room temperature. Only then was the hardboard panel coated with adhesive and the PVC sheet laminated to it after drying.

Run-down distance in mm at the respective test temperature, averages of five measurements

| Temperature (° C.) | Example 1 | Example 2 | Example 3 (Comparative) | Example 4 (Comparative) | Example 5 (Comparative) |
|---|---|---|---|---|---|
| 40 | — | — | — | — | — |
| 50 | 1 | 1 | 1 | 1 | 74 |
| 60 | 1 | 1 | 1 | 1 | all > 130 |
| 70 | 1 | 1 | 1 | 1 | |
| 80 | 1 | 1 | 1 | 1 | |
| 90 | 1 | 1 | 1 | 2 | |
| 100 | 1 | 1 | 2 | 1 | |
| 110 | 10 | 5 | 11 | 11 | |
| 120 | 72 | 43 | 74 | 74 | |

In test 3, the hardboard panel coated with the adhesive batch was stored at RT for four weeks and only then was the PVC sheet laminated on.

Run-down distance in mm at the respective test temperature, averages of five measurements

| Temperature (° C.) | Example 1 | Example 2 | Example 3 (Comparative) | Example 4 (Comparative) | Example 5 (Comparative) |
|---|---|---|---|---|---|
| 40 | — | — | — | — | — |
| 50 | 2 | 3 | 2 | 2 | 19 |
| 60 | 1 | 5 | 1 | 1 | all > 130 |
| 70 | 1 | 8 | 1 | 2 | |
| 80 | 2 | 9 | 2 | 5 | |
| 90 | 5 | 8 | 3 | 3 | |
| 100 | 18 | 3 | 24 | 1 | |
| 110 | 87 | 3 | 94 | 9 | |
| 120 | all > 130 | 21 | all > 130 | 82 | |

The invention claimed is:

1. A process for adhesively bonding substrates, comprising bonding the substrates with an adhesive comprising a polymer binder and a crosslinker compound I comprising carbodiimide groups, wherein the compound comprising carbodiimide groups is obtainable by reacting
   a) carbodiimides of 1,3-bis(1-methyl-1-isocyanatoethyl) benzene, 1,4-bis(1-methyl-1-isocyanatoethyl benzene or a mixture hereof with
   b) polyalkylene oxides of the formula

where $R_1$ is H or $CH_3$ and n is an integer from 1 to 100, and
   c) optionally, further compounds reactive with a) or b) in an amount less than 5% by weight, based on the sum of a), b) and c),
   wherein more than 40% by weight of the compound I is composed of ethylene oxide units.

2. The process according to claim 1, wherein at least 80% by weight of the compound I is composed of a) and b).

3. The process as claimed in claim 1, wherein the polymer is a polyurethane, a free-radically polymerized polymer or a mixture thereof.

4. The process as claimed in claim 3, wherein the polyurethane is synthesized from at least 60% by weight of diisocyanates, polyetherdiols and/or polyesterdiols.

5. The process as claimed in claim 3, wherein the polyurethane has a melting point in the range from −50 to 150° C.

6. The process as claimed in claim 3, wherein the free-radically polymerized polymer is synthesized from at least 60% by weight of principal monomers selected from $C_1$ to $C_{20}$ alkyl (meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds, and mixtures of these monomers.

7. The process according to claim 6, wherein the adhesive comprises 0.0001 to 0.1 mol of carbodiimide groups per 100 g of adhesive excluding from the calculation water or other organic solvents having a boiling point below 150° C. at 1 bar.

8. The process according to claim 1, wherein a polymer sheet, a wood veneer or paper is bonded to a nonflexible substrate.

9. The process according to claim 8, wherein the nonflexible substrate is a part made of wood or plastic.

10. The process according to claim 8, wherein the nonflexible substrate is a part made of bound natural or synthetic fibers or chips.

11. The process according to claim 8, wherein the nonflexible substrate is a hardboard or medium-density fiberboard (MDF) panel.

12. The process according to claim 1, wherein the adhesive is applied to a flexible substrate, drying takes place if appropriate in order to remove water or organic solvents, and the adhesive layer, in the course of subsequent bonding to a nonflexible substrate, is heated at temperatures from 20 to 200° C.

13. The process according to claim 10, wherein the flexible substrate, after having been coated with the adhesive and, optionally, dried, is wound up and stored.

14. A flexible substrate comprising at least one support and an adhesive coating according to claim 1.

15. The process according to claim 8, wherein the nonflexible substrate in the course of bonding has a temperature from 50 to 200° C.

16. The process as claimed in claim 3, wherein the polyurethane has a melting point in the range from 0 to 100° C.

17. An adhesively bonded assembly obtainable by a process according to claim 15.

18. The process as claimed in claim 1, wherein the compound comprising carbodiimide groups is obtainable by reacting a), b) and c).

19. The process as claimed in claim 1, wherein the compound comprising carbodiimide groups is obtainable by reacting a), b), but not c).

20. A process for adhesively bonding substrates, comprising bonding the substrates with an adhesive comprising a polymer binder and a crosslinker compound I comprising carbodiimide groups, wherein the compound comprising carbodiimide groups is obtainable by reacting
   a) carbodiimides of 1,3-bis(1-methyl-1-isocyanoethyl) benzene, 1,4-bis(1-methyl-1-isocyanatoethyl)benzene or a mixture thereof with
   b) polyalkalene oxides having at least two isocyanate-reactive groups of the formula

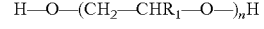

where $R_1$ is H or $CH_3$ and n is an integer from 1 to 100.
   wherein more than 40% by weight of the compound I is composed of ethylene oxide units.

* * * * *